Patented Apr. 13, 1943

2,316,604

UNITED STATES PATENT OFFICE 2,316,604

OXIDATION OF ORGANIC COMPOUNDS

Donald J. Loder, and Ambrose McAlevy, Wilmington, Del., assignors to E. I. du Pont de Nemours & Company, Wilmington, Del., a corporation of Delaware No Drawing. Application November 2, 1939, Serial No. 302,536

7 Claims. (Cl. 260—484)

This invention relates to oxidation processes and more particularly to the liquid phase oxidation of normally liquid olefinic materials.

Methods have previously been proposed for the oxidation of olefinic materials but these proposals have been primarily directed toward vapor phase oxidation processes. In such methods, control over the oxidation reaction is difficult, due to the high temperatures of operation, side reactions are apt to occur and yields of desired end products are consequently often unsatisfactory.

It is an object of the present invention to overcome the difficulties of the prior art and to provide a process for the controlled oxidation in a liquid phase of normally liquid olefinic materials.

It is a further and more specific object of this invention to provide a new and improved process for the production, from normally liquid olefinic materials, of useful hydroxylated compounds and derivatives thereof.

Other objects and advantages of the present invention will be apparent by reference to the following specification.

We have found that oxidation of normally liquid olefinic materials to valuable corresponding hydroxylated compounds can be accomplished with close control and good yield by subjecting the said olefinic materials to oxidation in a liquid phase by means of an oxygen-containing gas, for example, oxygen or air or air enriched with oxygen.

By olefinic materials we mean to include aliphatic compounds generally which contain at least one double bond between two carbon atoms. Such olefinic materials may contain functional groups, such as hydroxyl, halide, cyano, ester, carboxyl and like functional groups. Thus, according to our invention, it is possible to oxidize olefinic materials such, for example, as the amylenes, allyl alcohol, ethyl crotonate, allyl chloride, diallyl ether and the like, with production respectively of the corresponding amylene glycols, glycerol, ethyl alpha beta dihydroxy butyrate, glycerol alpha monochlorhydrin, and beta gamma tetrahydroxy di-n-propyl ether or derivatives thereof.

While our process may be carried out at various temperatures, depending somewhat upon the olefinic material which is being oxidized, and while these temperatures vary roughly from upward of 75° C. to about 250° C., generally speaking the use of temperatures in the more restricted range of 100 to 175° C., or preferably 100–140° C., tends, other conditions remaining the same, to give a higher proportion of useful hydroxylated products. Dependent upon the temperature utilized, the pressures employed may also vary within a wide range, the prime requisite being that as low a temperature as possible is employed to assure the maximum concentration of olefinic material in the liquid phase. We prefer, however, to use elevated pressures ranging upwards from about 2 atmospheres to about 100 atmospheres. Higher pressures, for example, as high as 1000 atmospheres may be used, however, if desired, inasmuch as we have found that pressure favors the reaction rate.

We have further discovered three factors which, taken together, produce the optimum result but which, nevertheless, individually contribute to an improved result as will appear hereinafter. Each of these factors, or methods, facilitate oxidation at low temperatures, improved results are obtained when any one of them is employed and the best results are secured when all three methods are used simultaneously.

As one of the three factors previously mentioned, we have found that the yields of hydroxylated compound produced according to my invention may be considerably increased by carrying on the oxidation in the presence of an oxidation catalyst, such, specifically, as the solid polyvalent metals have an atomic weight between about 50 and about 200. For example, we may use such metals in the finely divided metallic state or as organic and inorganic salts or oxides including such specific metals as cerium, cobalt, copper, manganese, silver and uranium, with or without inorganic acids such as nitric, phosphoric and hydrochloric acids or mixtures of any two or more of these substances. As specific catalysts under the above description, there may be employed vanadium, cerium and cobalt chlorides, iodine, cobalt acetate, copper acetate alone or with silver acetate, manganese acetate alone or together with barium acetate, barium or cobalt permanganate, sodium cobalti nitrite or mixtures of two or more of such compounds. In addition to the oxidation catalysts, promoters such as the alkali and alkaline earth metals may also be employed, if desired, such, for example, as the barium, magnesium and potassium acetates, butyrates, propionates, and the like.

As a further feature of the invention we have found that, specifically when operating at the lower temperature ranges, say 150° C., or below, enhanced yields and efficiency of the process are obtained if the oxidation is carried out in the presence of a solvent for the olefinic materials.

Various liquids substantially inert to the oxidation and capable of dissolving the olefinic materials such as carbon tetrachloride, water, acetic anhydride and benzene can be used, but we prefer to use as solvent an organic acid, such as acetic, propionic, butyric, trimethyl acetic and isobutyric, such aromatic acids as phenyl acetic, such hydroxy acids or derivatives as methoxy acetic, and the like. Varying proportions of these acids based upon the weight per cent present in the olefinic material being oxidized, may be utilized, such as from 1 to 99% by weight although we prefer to utilize about 37 to 80%. Within these indicated ranges we have found that the solvents effect a considerable increase in the yield of hydroxylated compound obtained by oxidation of the olefinic material.

As a further feature of the invention we have found that, especially when operating at the lower temperatures, say 150° C., or below, the yield and efficiency of the process may be even further improved by carrying on the oxidation, whether with or without the catalyst or solvent referred to previously, in the presence of one or more "initiators," which term we employ herein to designate substances capable of initiating attack on the olefinic material which may not readily react with molecular oxygen under my preferred low temperature conditions. For example, there may be employed inorganic peroxides, such as sodium or hydrogen peroxide; organic peroxides such as benzoyl peroxide; per acids, such as per-acetic and per-benzoic acids; the aldehydes, such as acetaldehyde, propionaldehyde, and isobutyraldehyde; ketones, such as acetone, methyl ethyl ketone, diethyl ketone, and cyclohexanone; ethers, such as diisopropyl, diethyl and diamyl ethers; and, in fact, any organic compound which tends to form peroxide bodies under the reaction conditions.

The initiator may be added to the reactants at the start or continuously during the oxidation or both; or, if preferred, the oxidation may be begun at a temperature and pressure at which hydroxylated compounds or peroxide bodies, capable of being oxidized to or acting as oxygen carriers, are formed, and the oxygen carrying bodies thus produced may thereafter act as oxygen carriers capable of attacking other molecules at the relatively low temperatures which we have generally outlined and will hereinafter more specifically describe. The constant maintenance of a concentration of initiator is important, however, and therefore, in general, we deliberately add the initiator to the reactants as described hereinafter. The oxygen carrier is thus able to initiate the oxidation which then may become at least partially self-sustaining at temperatures very much lower than otherwise possible.

The proportions of initiators which are desirable according to this invention range from about 0.1 to 10% based upon the weight of the hydrocarbon being treated. We do not wish to be restricted, to these proportions, however, for we have found that as much as 50% initiator may be utilized without deleterious effect upon progress of the oxidation and at the same time as low as 0.05% initiator may be employed with an increased efficiency and yield of hydroxylated products. Although primarily applicable to ketones such as acetone, dimethyl or methyl ethyl ketones, or cyclohexanones, and mixtures thereof, these ranges describe satisfactorily the amounts of other initiators which are suitable according to my invention.

Having described separately some of the features of our invention, the following description will illustrate by examples how these features may be combined for oxidation of olefinic materials generally.

*Example I*

A mixture containing 284.3 grams allyl acetate, 62.9 grams acetic acid, 5.6 grams methyl ethyl ketone, and 0.05 gram copper acetate, is charged into a tantalum lined converter of 1000 cc. capacity, provided with suitably valved gas outlet and inlet lines at top and bottom, respectively. The mixture is heated to 110° C., and air is introduced through the inlet line at the base of the converter until the pressure reaches 80 atmospheres. Air is then bubbled through the mixture for 3¼ hours at the rate of 180 liters per hour, the pressure being maintained at 80 atmospheres and the temperature at 110–155° C. The exit gas is directed through a condenser, and then through a series of traps cooled by a dry ice-methanol mixture to scrub out most of the allyl acetate vapor. The resultant product contained 122.3 grams unreacted allyl acetate and various glyceryl acetates. The glycerol was removed from the reaction products by reaction with methanol and $H_2SO_4$ to remove the acetyl groups, followed by distillation of the neutralized product in vacuo. 58.6 grams of glycerol was obtained corresponding to 39.3% yield.

*Example II*

A mixture containing 103 grams octylenes, 120 grams acetic acid, 3.3 grams methyl ethyl ketone, and 0.5 gram cobalt acetate was charged into a tantalum lined converter of 1000 cc. capacity, provided with suitably valved gas outlet and inlet lines at top and bottom, respectively. The mixture was heated to 130° C., and air was introduced through the inlet line at the base of the converter until the pressure reached 50 atmospheres. Air was then bubbled through the mixture for 2¾ hours at the rate of 210 liters/hr., the pressure being maintained at 50 atmospheres and the temperature at 130–140° C. The exit gas was passed through a condenser, and then through a series of dry ice cooled traps. Distillation of the product yielded 27.1 grams of octylene glycols.

*Example III*

A mixture containing 201.5 grams ethyl crotonate, 125.9 grams acetic acid, 5.6 grams methyl ethyl ketone, and 0.05 gram copper acetate was charged into a tantalum lined converter of 1000 cc. capacity, provided with suitably valved gas outlet and inlet lines at top and bottom, respectively. The mixture was heated to 112°, and air was introduced through the inlet line at the base of the converter until the pressure reached 50 atmospheres. Air was then bubbled through the mixture for 2 hours at the rate of 160 liters per hour, the pressure being maintained at 50 atmospheres and the temperature at 112–143° C. The exit gas was passed through a condenser, and then through a series of traps cooled by dry ice. Distillation of the product yielded in the residue ethyl alpha beta dihydroxybutyrate equivalent to 40.5 grams of methyl glycerol.

*Example IV*

A mixture containing 349.2 grams crotonyl acetate, 63.9 grams acetic acid, 5.4 grams methyl ethyl ketone and 0.05 gram copper acetate was treated as was ethyl crotonate as described in Example III, the mixture being heated to 112–

139° C. Air was then bubbled through the mixture for 2¼ hours at the rate of 160 liters per hour, the pressure being maintained at 50 atmospheres and the temperature at 112–139° C. and the product obtained, calculated as methyl glycerol, was 33.5 grams.

Example V

As described in Example III, 275.7 grams allyl chloride, 61.6 grams acetic acid, 5.8 grams methyl ethyl ketone, 0.025 gram copper acetate and 0.025 gram silver acetate were charged into a tantalum lined converter of 1000 cc. capacity. Similarly to that of Example III, the mixture was heated to 105° C. and air introduced through the inlet line at the base of the converter until the pressure reached 80 atmospheres pressure. Air was then bubbled through the mixture for 3¼ hours at the rate of 190 liters per hour, the pressure being maintained at 80 atmospheres pressure and a temperature of 105–135° C. 66.6 grams of glycerol was removed from the reaction products by treatment with an alcohol and distillation such as described in Example I.

Although specific disclosure has been made in the examples of methods of carrying on the invention in a batch process, it should be understood that this invention may also be practiced in a continuous manner. Thus, after completion of the oxidation to hydroxylated products, such as shown in the specific examples, the aliphatic materials unoxidized but capable of being converted to the desired hydroxylated products, plus the catalyst, solvent, and initiator may be recovered and recycled to the reaction zone together with further quantities of olefinic materials. In a continuous process it will be also found desirable to make such additions of catalyst, solvent, and initiator as will maintain the reaction rate and yield of hydroxylated compounds at the desired high degree.

While the process described in the examples involves passage of the oxidizing gas through a body of liquid, it will be understood that other means of assuring the desired liquid-gas contact may be employed as, for example, passage of liquid and gas co-current or counter-current through a tube or tower, which may be supplied with plates, packing or other devices for enhancing contact.

Various changes may be made in the details and preferred embodiments of this invention without departing therefrom or sacrificing the advantages thereof.

We claim:

1. A method of oxidizing a normally liquid aliphatic compound selected from the class consisting of allyl acetate, allyl chloride, and ethyl crotonate, which comprises subjecting such compound to oxidation in a liquid phase by means of a gas containing free oxygen, in the presence of an oxidation catalyst, an oxidation initiator selected from the group consisting of peroxides and peroxide-forming bodies, and an organic solvent for the compound, at a temperature within the range of from 75 to 250° C.

2. A method of oxidizing normally liquid ethyl crotonate to the corresponding hydroxylated compound which comprises subjecting ethyl crotonate to oxidation in a liquid phase by means of a gas containing free oxygen, in the presence of an oxidation catalyst, an oxidation initiator selected from the group consisting of peroxides and peroxide-forming bodies, and an organic solvent for the ethyl crotonate, at a temperature within the range of from 75 to 250° C.

3. A method of oxidizing normally liquid allyl chloride to the corresponding hydroxylated compound which comprises subjecting allyl chloride to oxidation in a liquid phase by means of a gas containing free oxygen, in the presence of an oxidation catalyst, an oxidation initiator selected from the group consisting of peroxides and peroxide-forming bodies, and an organic solvent for the allyl chloride, at a temperature within the range of from 75 to 250° C.

4. A method of oxidizing normally liquid allyl chloride to the corresponding hydroxylated compound which comprises subjecting such materials to oxidation in a liquid phase by means of a gas containing free oxygen in the presence of an oxidation catalyst, an oxidation initiator selected from the group consisting of peroxides and peroxide-forming bodies, and an organic acid solvent for the allyl chloride, at a temperature within the range of 75 to 250° C.

5. A method of oxidizing normally liquid allyl chloride to the corresponding hydroxylated compound which comprises subjecting such materials to oxidation in a liquid phase by means of a gas containing free oxygen in the presence of an oxidation catalyst, an oxidation initiator selected from the group consisting of peroxides and peroxide-forming bodies, and an organic acid solvent for the allyl chloride, at a temperature within the range of 100 to 140° C.

6. A method of oxidizing normally liquid allyl acetate to the corresponding hydroxylated compound which comprises subjecting such materials to oxidation in a liquid phase by means of a gas containing free oxygen in the presence of an oxidation catalyst, an oxidation initiator selected from the group consisting of peroxides and peroxide-forming bodies, and an organic acid solvent for the allyl acetate, at a temperature within the range of 75 to 250° C.

7. A method of oxidizing normally liquid allyl acetate to the corresponding hydroxylated compound which comprises subjecting such materials to oxidation in a liquid phase by means of a gas containing free oxygen in the presence of an oxidation catalyst, an oxidation initiator selected from the group consisting of peroxides and peroxide-forming bodies, and an organic acid solvent for the allyl acetate, at a temperature within the range of 100 to 140° C.

DONALD J. LODER.
AMBROSE McALEVY.